Patented Apr. 12, 1927.

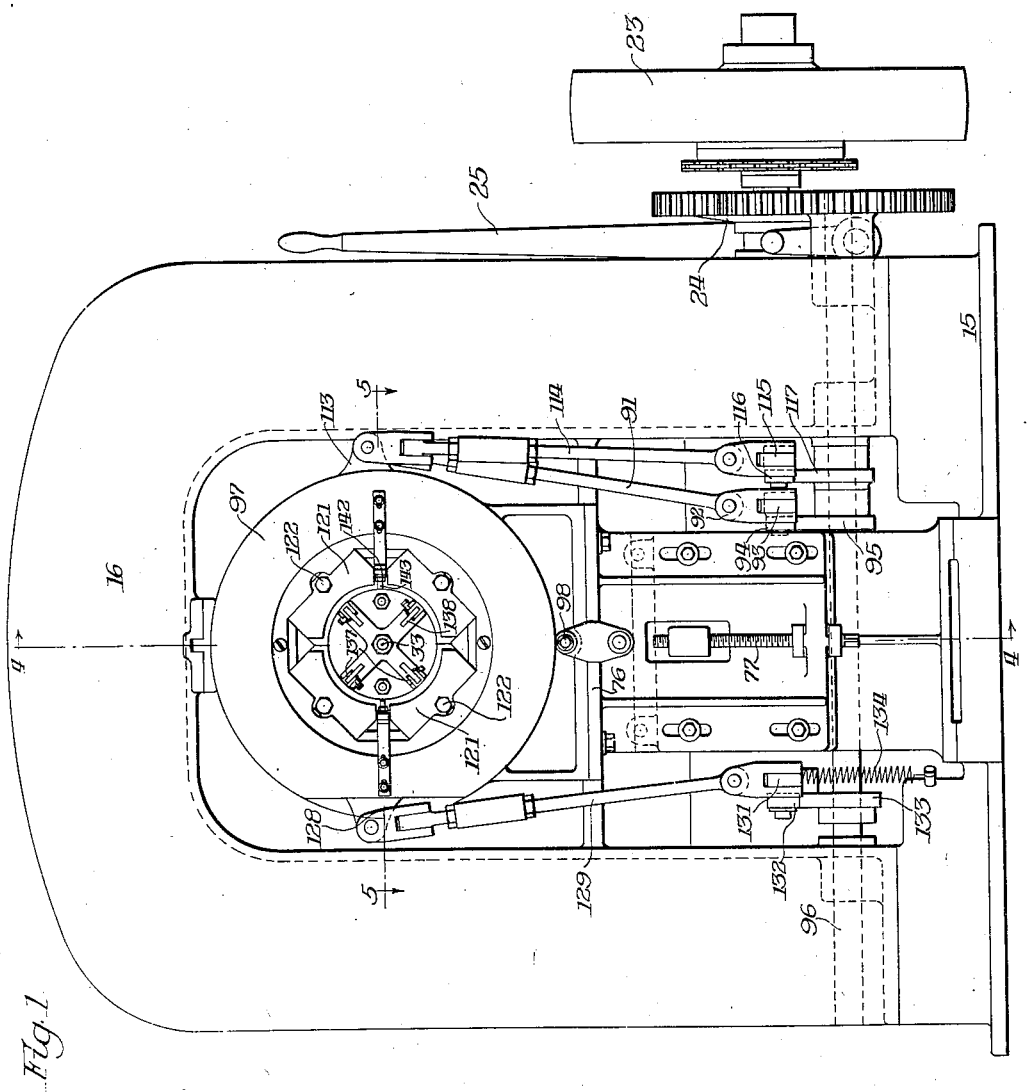

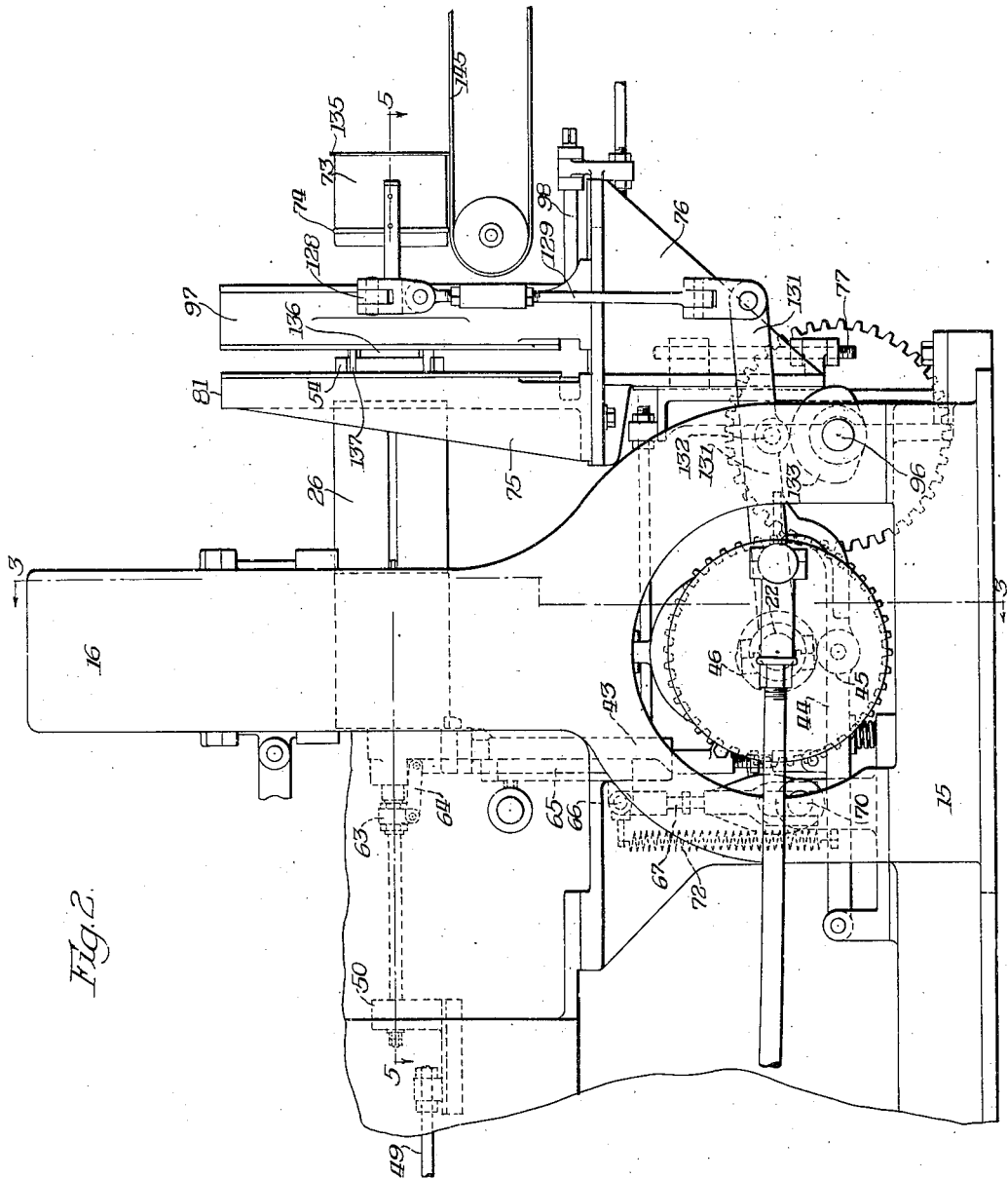

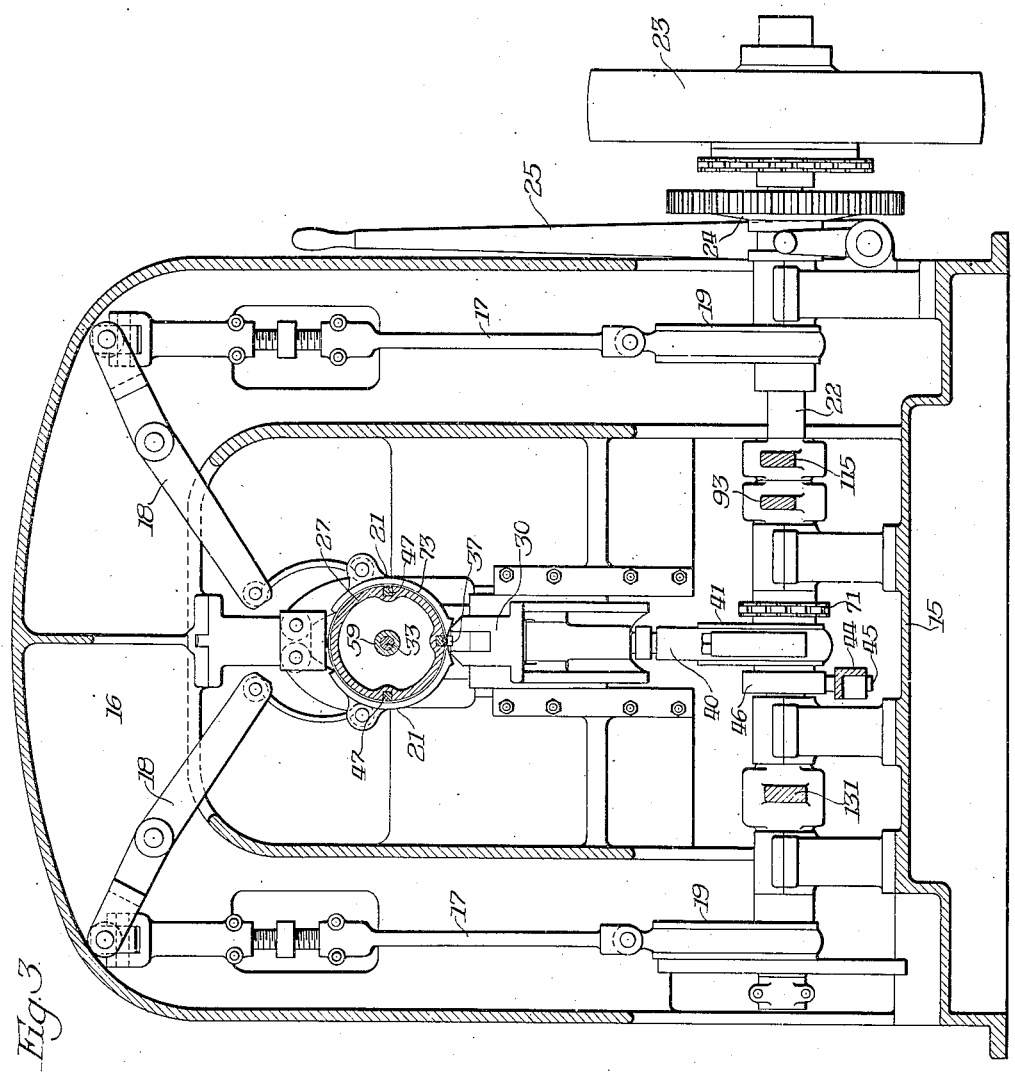

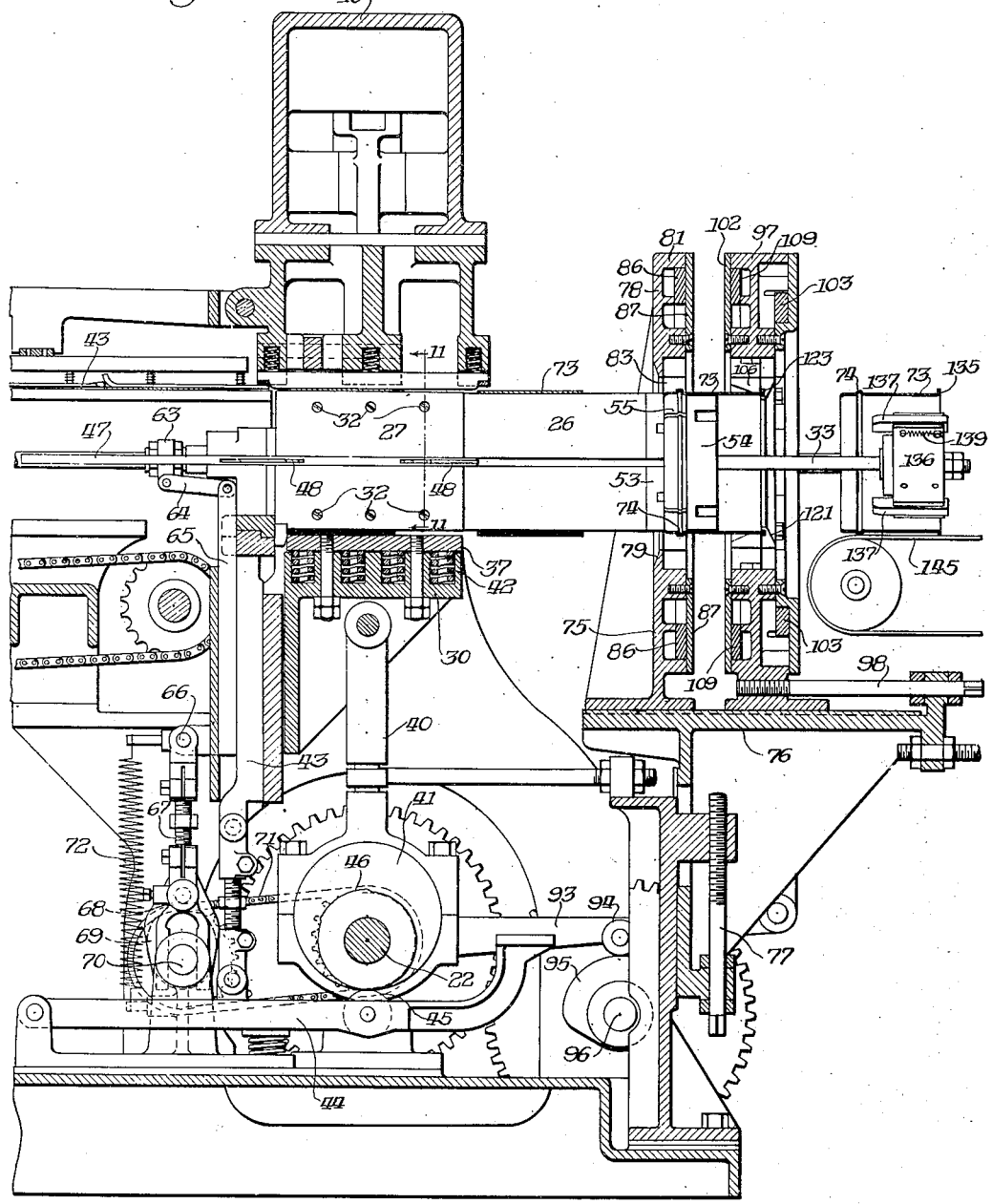

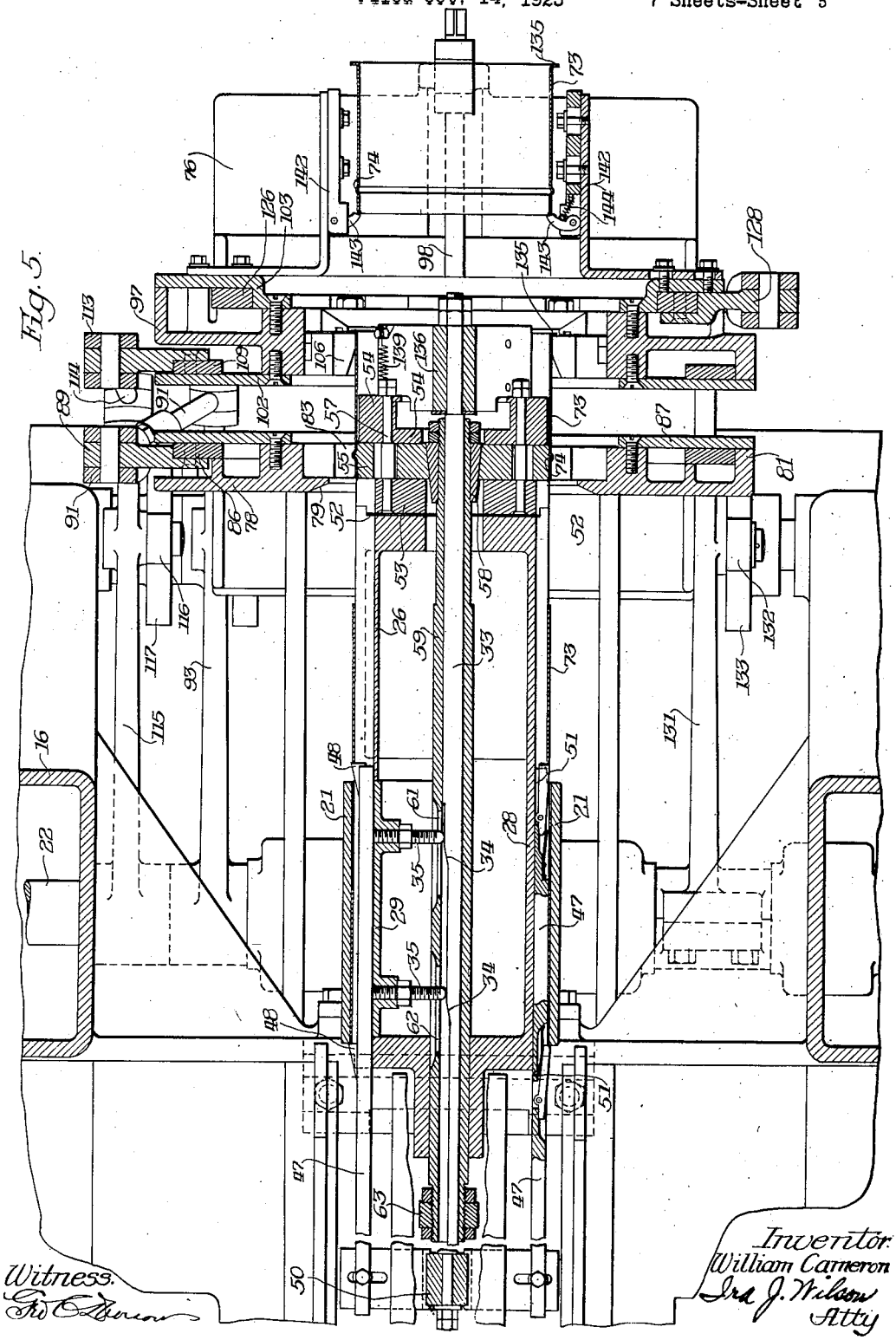

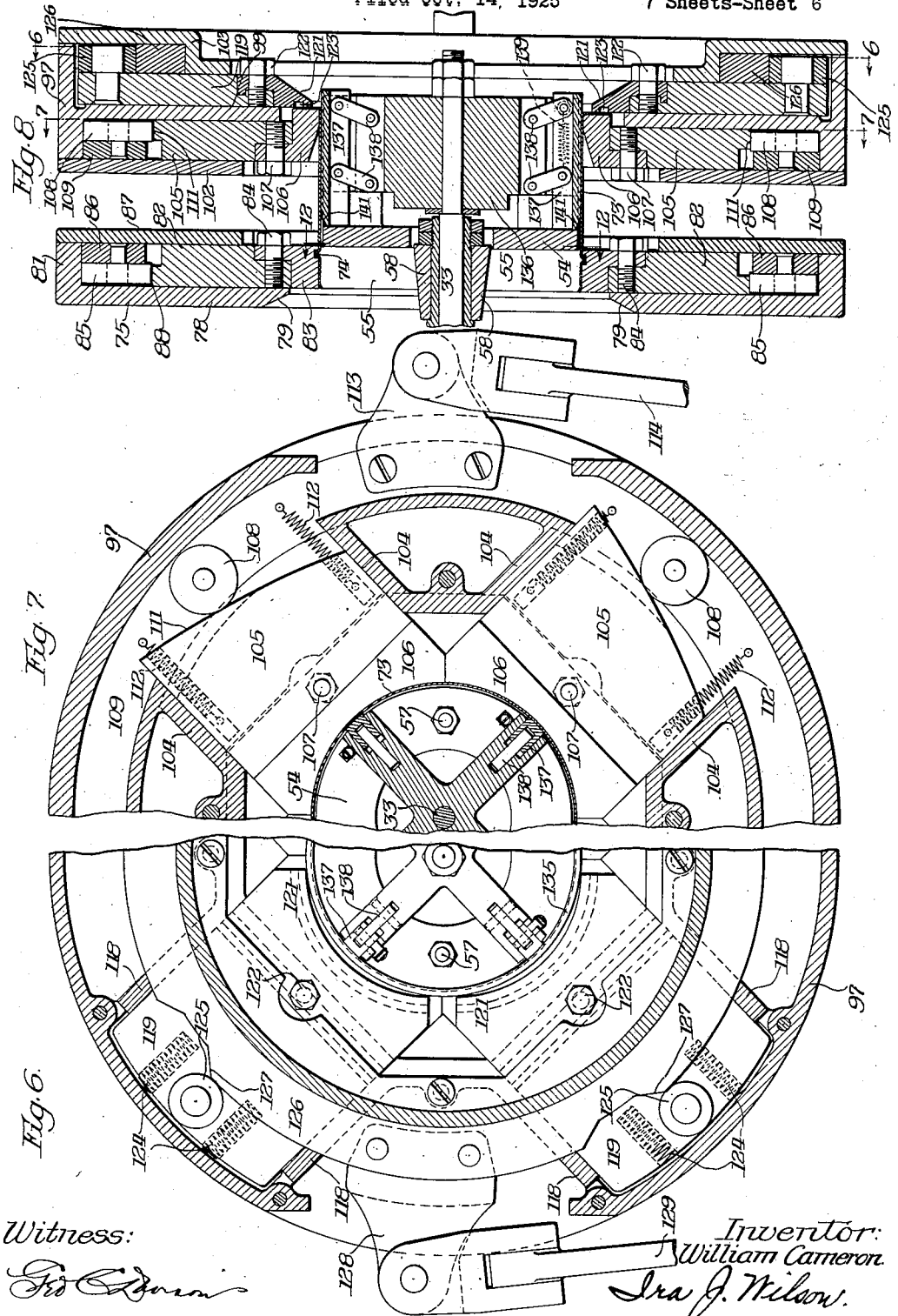

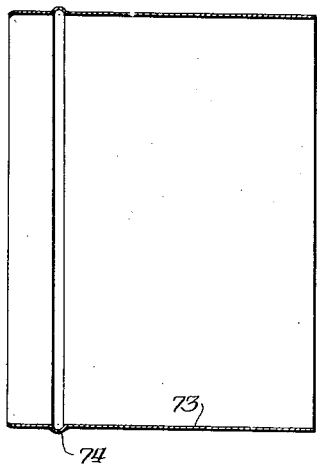
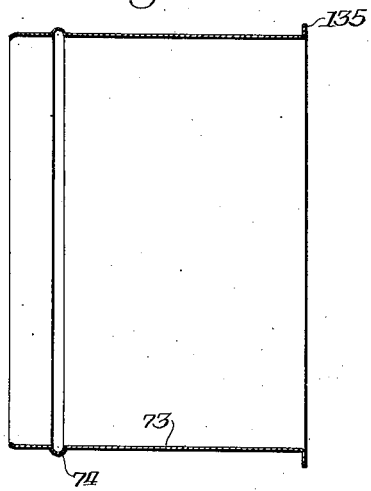
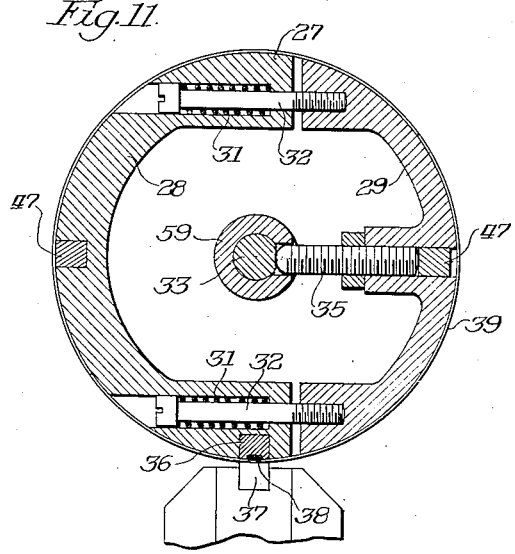
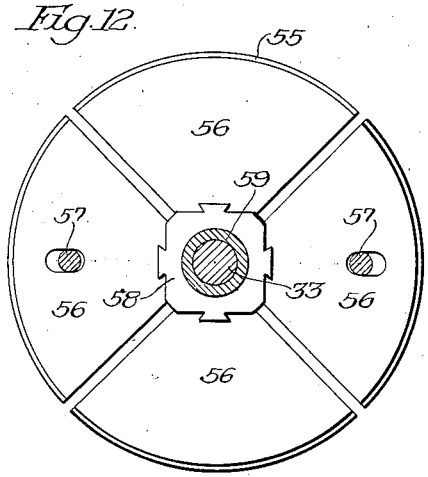

1,624,213

UNITED STATES PATENT OFFICE.

WILLIAM CAMERON, OF CHICAGO, ILLINOIS, ASSIGNOR TO CAMERON CAN MACHINERY COMPANY, OF CHICAGO, ILLINOIS, A CORPORATION OF ILLINOIS.

CAN-BODY-MAKING MACHINE.

Application filed October 14, 1925. Serial No. 62,424.

This invention pertains generally to machines for forming the bodies of tin cans which are formed from a sheet of tin bent into cylindrical form united at its edges into what is commonly termed a lock seam.

My present invention aims to improve upon some of the features of a machine of this character and to combine therewith a mechanism by which the cylindrical can body formed by the machine may be also beaded and flanged in the same machine so that it may be delivered complete, ready to receive the top and bottom, thereby eliminating the necessity of separate beading and flanging machines which have heretofore been considered essential.

One of the primary purposes of this invention is to combine with a body forming machine, a beading mechanism and a flanging mechanism which will operate reliably and efficiently to bead and flange the can bodies prior to their delivery from the body forming machine.

Another object is to provide a novel flanging mechanism adapted to form a flange at one end of can body by pulling the end outward radially by means of radially reciprocating flanging dies or members. Heretofore it has been customary to produce a flange at the end of a can body by forcing a tapered die into the body thereby gradually expanding the end into a flange, but I have found that the flanging may be accomplished more quickly and a better flange may be formed by pulling the end of the body outward radially against the face of holding members which embrace and snugly hold the body adjacent the base of the flange being formed.

Another object of the invention is to provide a flanging mechanism of the character indicated which will be accurate and reliable in its operation, which will form a perfect flange in a minimum of time and with a minimum expenditure of power and which will be durable in use.

Another object of my invention is to provide an improved mechanism for actuating the beading dies by which a bead is formed upon the can body simultaneously with the flanging operation and with this end in view, I have devised the improved operating mechanism for the internal beading dies which will be capable of exerting great power upon the cam or wedge block which expands the internal dies, thus insuring the formation of a perfect bead at each operation.

A further object is to provide a mechanism operable upon the inside of the can body only, for delivering the flanged and beaded body from the machine. This mechanism is novel in construction and efficient and satisfactory in use and the details thereof will be fully explained hereinafter.

Other objects and many inherent advantages of my invention should be appreciated as the invention becomes better understood by reference to the following description and when considered in connection with the accompanying drawings.

Referring to the drawings:

Fig. 1 is a rear end view of a machine embodying my invention.

Fig. 2 is a fragmentary side elevation thereof.

Fig. 3 is a sectional view on the line 3—3 of Fig. 2.

Fig. 4 is a longitudinal sectional view on the line 4—4 of Fig. 1.

Fig. 5 is an enlarged horizontal sectional view on the line 5—5 of Fig. 1.

Fig. 6 is a fragmentary sectional view on the line 6—6 of Fig. 8.

Fig. 7 is a fragmentary view on the line 7—7 of Fig. 8.

Fig. 8 is a diametral sectional view through the beading and flanging heads.

Fig. 9 is a sectional view of a can body after the beading operation has been completed.

Fig. 10 is a similar view after the completion of the flanging operation.

Fig. 11 is a sectional view through the expansible bumping horn taken on the line 11—11 of Fig. 4 and Fig. 12 is a sectional view on the line 12—12 of Fig. 8.

Referring to the drawings more in detail, reference character 15 indicates generally the base of a can body forming machine, the structure of which, so far as the mechanism for feeding and notching the blanks is concerned, may be of any preferred type and only the rear portion of such machine is shown on the drawings of this application.

Near the rear end of the machine is located an arch 16, adapted to contain the links 17, the levers 18 and the eccentrics 19 by which the forming wings 21 are actuated in the usual manner from the main shaft 22 journalled in suitable bearings carried by the case and adapted to be driven through a pulley 23 and clutch 24 controlled by a clutch lever 25.

The horn of the machine indicated generally by reference character 26 along which the can body travels, is mounted in the machine in the customary manner and its forward portion 27 (Figs. 3 and 4) around which the sheet of tin plate is wrapped by the wings 21 is of the expansible type illustrated more clearly in Fig. 11. From this figure it will be observed that this portion of the horn comprises two sectors 28 and 29 normally drawn together into contracted position by springs 31 acting upon stud bolts 32 and the sector 29 is forced away from the sector 28 into the expanded position shown in Fig. 11 by means of a reciprocating center rod 33 (Fig. 5) provided with a pair of cam surfaces 34 adapted as the rod moves toward the left viewing Fig. 5 to engage the adjustable studs 35 as shown in Fig. 11. The lower portion of the horn is equipped with an anvil block 36 between which and the bumping block 37, the lock seam 38 of the can body 39 is bumped and compressed to securely lock the ends of the tin plate together and provide a flat seam.

The bumping block 37 is carried by a reciprocatory head 30 which is moved up and down through a link 40 from an eccentric 41 mounted on the main shaft 22 in the usual manner. In order to preclude injury to the parts, the block 37 is yieldably supported on a series of springs 42 as best shown in Fig. 4.

The sheets of tin plate are fed through the machine along guideways 43 (Fig. 4) by well known reciprocatory feed dogs and in order that they may move without interference onto the expansible portion of the horn previously described, this portion of the horn is adapted to be slightly depressed just before each blank is fed therethrough and with this end in view, the horn is connected, as shown in Fig. 4, with a slide or link 43, the lower end of which is attached to a lever 44 carrying a cam follower 45 which engages a cam 46 of slight eccentricity mounted upon the shaft 22 so that upon each revolution of the shaft the forward end of the horn is pulled down slightly to insure the feeding of the blank into position thereon where it is then folded about the expansible horn by the wings 21 in a manner well known to those familiar with this art.

After the blank has been folded around the horn, its edges locked together and bumped flat as previously explained, the then cylindrical body which has been formed from the blank is fed along the solid portion 26 of the horn by reciprocatory slide bars 47 carrying spaced outwardly projecting feed dogs 48 adapted to engage behind the end of the formed body and slide the body rearwardly along the horn. These slide bars 47 are connected by a cross head 48 with the center rod 33 and these bars and the rod are reciprocated as a unit by means of well known mechanism acting through a connecting rod or link 49 (Fig. 2). Stop dogs 51 are employed, as is customary, to prevent return movement of the bodies with the feed bars. The bodies are delivered along this horn by the feeding mechanism described to the beading and flanging mechanism located at the rear end of the machine.

Referring now more particularly to Figs. 4 and 5, it will be observed that the rear end of the horn includes a pair of discs or plates 53 and 54 disposed in spaced relation and connected together by the bolts 52 and accommodating between them the internal expanding beading die 55 consisting, as shown in Fig. 12, of a plurality of segments 56, some of which are provided with a slot 57, through which a bolt 52 projects, thereby permitting radial movement of the die segment so that the die as a whole may be expanded and contracted. The expansion of these die segments is accomplished by a wedge-shaped block 58 having dovetailed connection with each segment and fixedly secured on a sleeve 59 surrounding the center rod 33. This sleeve is reciprocable to force the wedge block between the die members and cause their expansion but the length of its reciprocatory stroke is very much less than that of the stroke of the rod 33. The sleeve is cut away at 61 and 62 (Fig. 5) to accommodate the studs 35 of the expanding portion of the horn, and at its forward end, this sleeve has securely connected thereto a head 63 (Figs. 2, 4 and 5) through which movement is imparted to the sleeve.

One or more toggle links 64 are pivoted at one end to the head 63 and at the other end to a vertical slide link 65, the lower end of which is connected at 66 with an adjustable connecting rod 67 provided near its lower end with a cam follower 68 adapted to be elevated to raise the link 65 by means of a cam 69 mounted upon a countershaft 70 driven by a chain 71 from the main shaft 22. A spring 72 holds the cam follower in contact with the cam.

It will be observed that the links 64 in conjunction with the slide 65 form in effect a toggle which, as the slide is forced upwardly, exerts an extremely powerful thrust toward the left, viewing Fig. 4, upon the head 63 which forces the wedge block 58 with great power between the segments of the internal beaded die so that these segments are positively forced outwardly to form the bead in the surrounding can body.

The can bodies are indicated on the drawings by reference character 73 and from Fig. 9 it will be observed that the body, before the flange is formed thereon, is cylindrical and of uniform diameter except for the formation of the bead 74 which is formed by the internal expanding beading dies previously described operating in conjunction with the external dies which will be later described.

The external beading dies are mounted in a suitable housing indicated generally by reference character 75 supported at the rear end of the machine upon a bracket or table 76 which is vertically adjustable by means of an adjusting bolt 77 to align the dies with the horn.

Referring more particularly to Figs. 4, 5 and 8, it will be observed that the housing 75 comprises a front plate 78 provided with a central opening 79 to receive the can bodies and with a peripheral flange 81 and is formed like the housing for the flanging dies, shown in detail in Fig. 7, to provide radial guides in which the segmental beading die carriers 82 may radially reciprocate. Each carrier is equipped at its inner end with a segmental beading die 83 secured thereto by a bolt 84 or otherwise. The dies are normally urged outwardly by springs as will be explained more in detail in the description of the flanging dies shown in Fig. 7 and are forced inwardly by rollers 85 mounted upon an oscillatory ring 86 disposed between the front plate 75 and the rear plate 87 of the housing. Each die carrier is formed at its outer end to provide a cam surface 88 and when the ring 86 is moved in one direction the rollers 85 acting upon the cam surfaces 88 of their respective die carriers will force the dies inwardly into cooperative relation with their companion internal dies 55 to form the bead 74 on the can body.

The ring 86 is provided at one side, as shown in Fig. 5 with a radially extending arm 89 projecting through an opening in the flange 81 of the housing and connected outside the housing with the upper end of a link 91 which is connected at its lower end with a lever 93, fulcrumed at its inner end upon the main shaft 22 and provided intermediate its end with a cam follower 94 riding upon, and actuated by, a cam 95 upon the cam shaft 96 driven in the proper timed relation in any suitable manner.

When through this mechanism the ring 86 is oscillated in one direction the external beading dies will be forced inwardly into cooperation with the internal dies which are simultaneously expanded into cooperative relation with the external dies and when the ring is oscillated in the opposite direction the external dies will be released and will be moved outwardly away from the can body by their respective springs. It will be observed that both the internal dies 55 and the external dies 83 are shaped to slightly bend inwardly the end of the body adjacent the bead so that this end of the body will readily receive a removable slip cover. This bending in is causd by the shape of the internal and external beading dies and is customarily termed "mouthing in".

Simultaneously with the performance of the beading and mouthing in operations upon one end of the body, the other end of the body is operated upon to form a radial flange thereon. The mechanism by which this flanging operation is performed will now be described. Referring to Figs. 1 and 4 to 8 inclusive, it will be observed that the flanging mechanism is carried in a housing designated generally by reference character 97, also supported upon the bracket 76, this housing being adjustable endwise of the bracket by means of an adjusting screw 98 to position the flanging mechanism for operation upon can bodies of various lengths.

The housing comprises a central plate 99 provided with a peripheral flange 101 projecting in both directions from the plate, a front plate 102 and a rear plate 103. On its front face the plate 99 is formed as shown in Fig. 7 to provide a plurality, four in the present instance, of guide-ways, the walls of said guide-ways being formed by ribs 104. In each of these guide-ways there is disposed between the center and front plate a reciprocatory guide-carrier 105, provided at its inner end with a segmental holding or embracing die 106 secured thereto by a bolt 107. These dies, when in the inner position shown in Figs. 7 and 8, form in conjunction with each other a continuous circular frame adapted to surround and snugly embrace the perimeter of a can body 73 adjacent the outer or rear end thereof. These holding dies, similarly to the external beading dies hereinbefore described, are forced inwardly into holding position by rollers 108 carried by an oscillatory ring 109 and acting upon the cam surfaces 111 of their respective die carriers. Springs 112 for each carrier tend to retract the dies outwardly away from the can body upon oscillation of the ring 109 in a clockwise direction, viewing Fig. 7. This ring, similarly to the ring 86, is provided at one side with a radially projecting arm 113 which is connected with the upper end of a link 114, the lower end of which is connected to the outer end of a lever 115 fulcrumed upon the main shaft 22 and carrying intermediate its ends a follower 116 adapted to ride upon a cam 117 fixed upon the countershaft 96.

The opposite face of the center plate 99 of the housing is also shaped to provide a plurality, in the present instance four, radially disposed guide-ways formed by ribs 118 (Fig. 6) projecting from the plate 99. Each guide-way receives a die carrier 119 which is equipped at its inner end with a flanging die 121 secured to the carrier by a bolt 122 or other means. The rear face of each die 121 is provided with a segmental groove 123 and when the dies are in their innermost position, as shown in Figs. 4, 6 and 8, a complete circular groove is afforded for the reception of the outer end of the can body as shown in Fig. 4. It will be observed that this groove into which the end of the can body is fed by the feeding mechanism previously described, is disposed in close proximity to the outer face of the holding dies 106, so that when these flanging dies are moved radially outwardly by a mechanism, which will be later described, that portion of the can body projecting into the groove will be pulled and expanded radially outwardly into a radial flange lying against the outer face of the dies 106, as shown in Fig. 8.

The dies 121 are normally urged into their innermost position, shown in Fig. 4, by springs 124 disposed in sockets formed in the outer end of each die carrier 119, each spring being compressed between the bottom of its socket and the opposed inner wall of the housing flange 97. Each carrier 119 is provided near its outer end with the roller or cam follower 125 and an oscillatory ring 126 is provided with a surface 127 for each roller so that when the ring is oscillated in a clockwise direction, viewing Fig. 6, the rollers will be forced outwardly, thereby pulling their respective dies 121 radially outwardly to expand the end of the can body into a radially disposed flange.

The ring 126 is provided at one side with a radially projecting arm 128 to which the upper end of a link 129 is pivoted, the lower end of this link being connected to the outer end of a lever 131, also fulcrumed upon the main shaft 22 and provided with a cam follower 132 adapted to ride upon a cam 133 mounted upon the countershaft 96. A spring 134 holds the lever 131 down against its cam.

The timing of the beading and flanging mechanism is such that when a can body is fed to the beading and flanging station the internal beading dies will be contracted, the external beading dies will be expanded, the holding dies 106 will be in their outer position, while the flanging dies 121 will be in their inner position so that the advancing end of the can body will enter the groove 123. The internal beading dies will then be expanded simultaneously with the contraction of the external beading dies so as to form the beading 74. The holding dies 106 will be moved inwardly to snugly embrace the periphery of the can body in proximity to the groove 123 whereupon the flanging dies 121 will be moved radially outwardly to pull and expand the end of the body engaged in the groove 123 into a radially disposed flange 135 as shown in Fig. 10. The holding dies 106 and the beading dies are then retracted from engagement with the can body leaving the beaded and flanged body free for delivery from the machine.

The mechanism for delivering the beaded and flanged body from the beading and flanging station is carried by the outer or rear end of the reciprocating center rod 33. This mechanism as shown in Figs. 5 and 8 comprises a head 136 fixed upon the rod 33 and carrying a plurality, preferably four, shoes 137 which are connected to the head by parallel links 138 disposed in opposed grooves formed in the head and the shoes. A spring 139 for each shoe tends to swing these parallel links outwardly so as to force the shoe into engagement with the interior walls of the can body. The timing of the machine is such that during the beading and flanging operations, the delivery device just described is delivering the preceding can body and does not return to the interior of the body at the beading and flanging station until after the beading and flanging operation on this body has been completed. Upon the return stroke of the rod 33 with its delivery mechanism the shoes enter the body, their entrance being facilitated by the taper 141 which formed on the inner end of each shoe. The springs 139 tend to straighten out the toggle links 138 and this tendency is increased by the friction of the shoes with the can body walls as soon as the head 136 starts its delivery travel toward the right viewing Fig. 8. The can body is, therefore, carried from the beading and flanging station by the shoes 137 into the position shown in Fig. 5.

For the purpose of stripping the body from the delivery mechanism upon the return movement of this mechanism, I have mounted upon suitable brackets 142, a pair of stripping dogs 143. These dogs are pivoted to their brackets which are urged into the position shown in Fig. 5 by light springs 144. During the outward and feeding movement of the feed mechanism, the can body strikes these stripping dogs and swings them to the right against the force of the light springs 144 until the body has passed the dogs, whereupon they snap back into the position shown in Fig. 5, so that upon return movement of the feeding mechanism the end of the body strikes the stripper dogs which prevent further return movement of the body and thereby enables the delivery mechanism to withdraw from the body, their withdrawal being facilitated by the yieldable mounting of the shoes 137 which swing radially inwardly under slight pressure tending to swing them toward the right, viewing Fig. 8. After being stripped from the delivery mechanism the can body may be discharged in any suitable manner and, as for instance, by a discharge belt upon which the bodies fall from the stripper mechanism.

It is believed that my invention and many of its attendant advantages will be understood from the foregoing without further description and it should be manifest that the details of construction illustrated and described may be varied within wide limits, without departing from the essence of the invention as defined in the following claims.

I claim:

1. A flanging mechanism comprising, means for holding a can body adjacent the end to be flanged, and means supported outside the perimeter of said body and movable radially of the body for forming a flange thereon.

2. A flanging mechanism comprising, means for holding a can body in position to be flanged and means provided with an arcuate groove for engaging the marginal end of said body and pulling the same outward radially to form a flange.

3. The combination of a flanging device provided with a groove adapted to be disposed in the path of an advancing can body to receive the end of said body therein, means for advancing a body into operative relation with said device, and means for moving said device radially outward at right angles to the path of travel of said body to thereby flange the end of said body.

4. The combination of means for advancing a can body, flanging means including a plurality of radially movable devices forming together when in contracted relation an open groove to receive the end of an advancing body, and means for moving said devices outward radially from said body to thereby form a flange upon the end of said body.

5. In a flanging mechanism, the combination of a plurality of radially movable flanging devices providing when disposed in their innermost positions an annular groove adapted to receive the end of a can body, means for embracing and holding said body in proximity to said groove, and means for moving said devices outward radially so as to expand the end of the body projecting beyond the holding means and form the same into a flange.

6. In a flanging mechanism, the combination of means for embracing a can body adjacent the end to be flanged, means mounted outside the periphery of said body for engaging the inner perimeter of that portion of the body projecting beyond said holding means, and means for moving said engaging means outward radially beyond the perimeter of the body to expand said projecting portion of the body into a radially disposed flange.

7. In a can body flanging mechanism, the combination of a plurality of radially reciprocable flanging devices mounted outside the path of an advancing body each provided on one face with a segmental shoulder adapted to be positioned inside the end portion of a can body, means for embracing the body adjacent to said shoulder, and means for moving said devices outward radially to expand the end portion of the body into a flange and means for feeding said flanged body between said flanging devices.

8. In a can body flanging mechanism, the combination of a plurality of radially reciprocable holding members adapted when in contracted position to embrace the perimeter of a can body adjacent one end thereof, means for positively moving said members into contracted position, springs for restoring said members to expanded position, a plurality of radially reciprocable flanging devices providing when in contracted position an annular groove adjacent to said holding members adapted to receive the end of a can body to be flanged, springs for urging said devices into contracted position, and means for positively moving said devices into expanded position whereby the end of said body disposed in said groove is expanded to form a flange.

9. In a flanging mechanism, the combination of a plurality of radially reciprocable end body members each provided with a cam, an oscillatory ring provided with cam followers, means for actuating said ring to force said members inwardly, springs for retracting said members, a plurality of radially reciprocable flanging devices shaped to receive the end of a can body, an oscillatory ring provided with cam surfaces, a cam follower mounted on each of said flanging devices, means for actuating said cam ring to force each of said devices outward radially whereby a flange is formed on the can body, and springs for urging said devices inwardly in position to receive the end of a can body.

10. In a machine of the character described, the combination of a beading mechanism including internal expanding dies, external contracting dies adapted to cooperate therewith, means for actuating said dies to form a bead on the can body, a flanging mechanism comprising can body holding members, flanging devices supported outside the path of the can body movable radially of the can body, and means for actuating said members and flanging devices.

11. In a machine of the character described, the combination of means for advancing can bodies to a beading and flanging station, means for forming a bead on said body at said station, means for flanging one end of the body at said station said flanging means including devices reciprocable in a plane at right angles to the path of movement of said body, means disposed within the body for delivering said body from the beading and flanging station, and means for stripping said body from said delivery means.

12. In a machine of the character described, the combination of means for advancing can bodies to a beading and flanging station, mechanism for forming a bead on said body adjacent one end thereof at said station, means for forming a flange on the other end of said body at said station, and means engageable with the interior of said body for delivering the same from said station.

13. In a machine of the character described, the combination of means for advancing a can body, mechanism for operating upon said body, and an expansible delivery device engageable with the interior of said body for delivering the same from the flanging station.

14. In a machine of the character described, the combination of means movable radially of a can body to form a flange thereon, and means engageable with the interior of said flanged body for delivering said body beyond the flanging mechanism.

15. In a machine of the character described, the combination of means for advancing can bodies to an operating station, mechanism for operating upon said bodies at said station, and means for delivering the bodies from said station, said last mentioned means comprising members adapted to be expanded radially into engagement with the interior of said body and movable axially of the body to carry said body therewith.

16. In a machine of the character described, the combination of mechanism for operating upon a can body, and means for delivering said body from said mechanism, said means comprising members movable outward radially into engagement with the interior of said body and means for moving said members bodily so as to carry the can body.

17. In a machine of the character described, the combination of mechanism for operating upon a can body, and means for delivering said body from the operating mechanism, said means including a head movable axially of the body and members carried thereby movable radially of the body into engagement with the interior walls thereof whereby said body is caused to move axially with said head.

18. In a machine of the character described, the combination of mechanism for operating upon a can body, and feeding mechanism for the body, including a reciprocable head and can engaging devices carried by said head and movable outward radially into engagement with the interior of said body.

19. In a machine of the character described, the combination of a horn adapted to support a can body, a bumping mechanism for flattening the lock seam formed in said body, a portion of the horn opposed to said bumping mechanism being expansible, means for expanding said portion of the horn prior to the bumping operation, means for advancing the can body from said bumping station, means movable radially of the body for forming a flange thereon, means engageable with the interior of the body for delivering said body from the flanging station, and means engageable with the flange for stripping the body from the delivering means.

20. In a machine of the character described, the combination of mechanism for forming a lock seam can body, means for beading said body adjacent one end thereof, means movable radially of the body for forming a flange at the other end of said body, and means engageable with the interior of said body for delivering the body from the flanging means.

21. In a machine of the character described, the combination with mechanism for forming a lock seam can body, means for advancing the bodies so formed, means for flanging one end of said body, and delivery mechanism engageable with the interior of the flanged body for delivering the same from the machine.

22. In a machine of the character described, the combination of a can body forming mechanism including an expansible bumping horn, a rod extending longitudinally through said horn and provided with means for expanding the horn, mechanism including expansible internal beading dies, delivery mechanism carried by said rod, a sleeve surrounding said rod, means mounted on said sleeve for expanding said beading dies, means for reciprocating said rod, and independent means for reciprocating said sleeve.

23. In a machine of the character described, the combination of mechanism for forming can bodies, including an expansible bumping horn, beading mechanism including expansible internal beading dies, a reciprocating rod for expanding said bumping horn, a reciprocating sleeve surrounding said rod, means carried by said sleeve for expanding said beading dies, mechanism for reciprocating said rod and mechanism including a toggle for reciprocating said sleeve.

24. In a machine of the character described, the combination of mechanism for forming a lock seam can body, means for flanging said body, mechanism engageable with the interior of the flanged body for delivering the same from the machine, said mechanism including a head and a reciprocating rod upon which said head is mounted, a sleeve surrounding said rod, internal expanding beading dies, means carried by said sleeve for expanding said dies, and mechanism for reciprocating said rod and said sleeve in predetermined timed relation.

25. In a machine of the character described, the combination of an expansible bumping horn, a reciprocating rod, means actuated by said rod for expanding said horn, a reciprocating sleeve surrounding said rod, expansible beading dies operated by said sleeve, means for reciprocating said rod, and means including a toggle for reciprocating said sleeve in timed relation but through a shorter stroke than said rod.

26. In a machine of the character described, the combination with a can body forming mechanism including an expansible bumping horn, a reciprocating rod extending through the horn, means operated by said rod for expanding the horn, can delivery mechanism carried by said rod, said mechanism being constructed to engage the interior of a can body, flanging mechanism including grooved devices reciprocable in a plane at right angles to the axis of the can body being flanged, beading mechanism including internal expansible beading dies, means independent of said mechanism for operating said dies, and means for embracing and holding a can body during the flanging and beading operations.

27. In a machine of the character described, the combination with a body forming mechanism including a bumping horn, mechanism for forming a bead on a can body, mechanism for flanging one end of said body, feeding mechanism engageable with one end of a body for advancing said body to the beading and flanging mechanism, delivery means engageable with the interior of the flanged body for delivering the same from the machine, and means for stripping said flanged body from the delivery mechanism.

In witness of the foregoing I affix my signature.

WILLIAM CAMERON.